US012774098B2

(12) United States Patent
Mukherjee et al.

(10) Patent No.: US 12,774,098 B2
(45) Date of Patent: Oct. 27, 2026

(54) ELECTRONIC DROGUE REEFING RELEASE SYSTEM

(71) Applicant: Rockwell Collins, Inc., Cedar Rapids, IA (US)

(72) Inventors: Akash Mukherjee, Plano, TX (US); John L. Hampton, Bradenton, FL (US); Osvaldo Sanchez, Richardson, TX (US); Joseph Chamberland, Cedar Rapids, IA (US); Talyn Meyer, Cedar Rapids, IA (US); Tyler John Esposito, Enfield, CT (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 0 days.

(21) Appl. No.: 18/789,900

(22) Filed: Jul. 31, 2024

(65) Prior Publication Data

US 2026/0035079 A1 Feb. 5, 2026

(51) Int. Cl.

*B64D 17/38* (2006.01)
*B64D 17/24* (2006.01)
*B64D 17/34* (2006.01)
*B64D 25/10* (2006.01)

(52) U.S. Cl.

CPC ........... *B64D 17/386* (2013.01); *B64D 17/24* (2013.01); *B64D 17/343* (2013.01); *B64D 25/10* (2013.01)

(58) Field of Classification Search

CPC ..... B64D 17/386; B64D 17/343; B64D 25/10
See application file for complete search history.

(56) References Cited

U.S. PATENT DOCUMENTS 2,755,550 A 7/1956 Benjamin
2,897,799 A 8/1959 Stupian
3,036,798 A * 5/1962 Martin .................. B64D 17/38 83/639.4
3,049,322 A 8/1962 Vlasic
3,362,664 A 1/1968 Mcelroy
3,401,905 A 9/1968 Rohrlick
4,752,050 A 6/1988 Johnson
5,248,117 A 9/1993 Hennings
(Continued)

FOREIGN PATENT DOCUMENTS

CN 110723298 A 1/2020
GB 748009 A 4/1956

OTHER PUBLICATIONS

"Ejection Site." URL: <www.ejectionsite.com>. Retrieved from Internet Archive from Oct. & Nov. 2022. 14 pages. (Year: 2022).*
(Continued)

*Primary Examiner* — Joshua J Michener
*Assistant Examiner* — Michael B. Kreiner
(74) *Attorney, Agent, or Firm* — CANTOR COLBURN LLP

(57) ABSTRACT

An electronic drogue reefing release system includes a drogue parachute having a canopy, one or more reefing lines coupled to the canopy, one or more reefing line cutters coupled to the canopy, and one or more signal lines configured to deliver an electrical signal. The reefing lines are configured to restrict expansion of the canopy while in a first reefing state. The reefing line cutters are configured to place the at least one reefing line into a second reefing state in response to receiving the electrical signal so as to expand the canopy.

16 Claims, 11 Drawing Sheets

(56) References Cited

U.S. PATENT DOCUMENTS

| | | | | |
|---|---|---|---|---|
| 7,703,720 | B2 | 4/2010 | Smith et al. | |
| 8,608,112 | B1 | 12/2013 | Levay | |
| 10,577,111 | B2 * | 3/2020 | Vander Lind | B64D 17/62 |
| 11,286,052 | B2 * | 3/2022 | Holstine | B64D 17/36 |
| 11,834,185 | B2 * | 12/2023 | Carson | B64D 17/56 |
| 11,873,108 | B2 | 1/2024 | Vo et al. | |

OTHER PUBLICATIONS

Search Report issued in British Patent Application No. 2511819.1; Date of Mailing Jan. 23, 2026 (4 pages).

* cited by examiner

ELECTRONIC DROGUE REEFING RELEASE SYSTEM

BACKGROUND

The subject matter disclosed herein generally relates to parachute systems and, more particularly, to an electronic drogue reefing release system.

Aircraft may be equipped with ejection systems for ejecting a pilot or occupant (user) from the aircraft upon activation of the ejection system. For example, during ejection events, an ejection seat may be propelled from an aircraft cockpit. The ejection seats may include parachute systems configured to reduce the velocity of the ejection seat and its occupant and deliver the seat and/or the occupant safely to land or sea. The parachute systems may include a drogue parachute, which may deploy rapidly in response to expulsion of the ejection seat from the cockpit. The drogue parachute may decelerate and stabilize the ejection seat to enable safe deployment of a main parachute.

SUMMARY

According to a non-limiting embodiment, an electronic drogue reefing release system includes a drogue parachute having a canopy, one or more reefing lines coupled to the canopy, one or more electrically controlled reefing line cutters coupled to the canopy, and one or more signal lines configured to deliver an electrical signal to a respective electronically controlled reefing line cutter. The reefing lines are configured to restrict expansion of the canopy while in a first reefing state. The electrically controlled reefing line cutters are configured to place the at least one reefing line into a second reefing state in response to receiving the electrical signal so as to expand the canopy.

In addition to one or more of the features described above, or as an alternative to any of the foregoing embodiments, a controller in signal communication with the at least one signal line, the controller configured to determine a reefing cutting time duration, and to output the electrical control signal in response to an expiration of the reefing cutting time duration.

In addition to one or more of the features described above, or as an alternative to any of the foregoing embodiments, the reefing cutting time duration is based on at least one flight metric.

In addition to one or more of the features described above, or as an alternative to any of the foregoing embodiments, the at least one flight metric includes one or a combination of occupant weight, airspeed, and altitude.

In addition to one or more of the features described above, or as an alternative to any of the foregoing embodiments, a plurality of suspension lines are coupled to the canopy, and at least one bridle includes a first end coupled to the suspension lines and an opposing second end coupled to an ejection seat. The at least one signal line is coupled to the bridle and at least one of the suspension lines.

In addition to one or more of the features described above, or as an alternative to any of the foregoing embodiments, the at least one electrically controlled reefing line cutter includes a knife blade configured to sever the at least one reefing line in response to receiving the electrical signal to place the at least one reefing line into the second reefing state.

In addition to one or more of the features described above, or as an alternative to any of the foregoing embodiments, the at least one reefing line includes: a first reefing line disposed a first distance away from a circumferential edge of the canopy; and a second reefing line disposed a second distance away from the circumferential edge of the canopy that is greater than the first distance.

In addition to one or more of the features described above, or as an alternative to any of the foregoing embodiments, the at least one electrically controlled reefing line cutter includes: a first electrically controlled reefing line cutter disposed adjacent to the first reefing line; and a second electrically controlled reefing line cutter disposed adjacent to the second reefing line.

According to another non-limiting embodiment, an electronic drogue reefing release system comprises a drogue parachute including a canopy, at least one reefing line coupled to the canopy, at least one reefing line cutter coupled to the canopy, and at least one explosive assembly line having a first end coupled to an electrically controlled detonator and an opposing second end coupled to an energy output terminal. The at least one reefing line is configured to restrict expansion of the canopy while in a first reefing state. The at least one reefing line cutter is configured to place the at least one reefing line into a second reefing state in response to receiving an electrical signal so as to expand the canopy. The electrically controlled detonator is configured to receive an electrical control signal and to generate an explosion force in response to the electrical control signal, and the energy output terminal is configured to deliver the explosion force to the at least one reefing line cutter.

In addition to one or more of the features described above, or as an alternative to any of the foregoing embodiments, a controller is in signal communication with the electrically controlled detonator. The controller is configured to determine a reefing cutting time duration, and to output the electrical control signal in response to an expiration of the reefing cutting time duration.

In addition to one or more of the features described above, or as an alternative to any of the foregoing embodiments, the reefing cutting time duration is based on at least one flight metric.

In addition to one or more of the features described above, or as an alternative to any of the foregoing embodiments, the at least one flight metric includes one or a combination of occupant weight, airspeed, acceleration, and altitude.

In addition to one or more of the features described above, or as an alternative to any of the foregoing embodiments, a plurality of suspension lines are coupled to the canopy, and at least one bridle includes a first end coupled to the suspension lines and an opposing second end coupled to an ejection seat. The at least explosive assembly line is coupled to the bridle and at least one of the suspension lines.

In addition to one or more of the features described above, or as an alternative to any of the foregoing embodiments, the at least one reefing line cutter includes a knife blade configured to sever the at least one reefing line in response to receiving the explosion force to place the at least one reefing line into the second reefing state.

In addition to one or more of the features described above, or as an alternative to any of the foregoing embodiments, the at least one reefing line includes a first reefing line disposed a first distance away from a circumferential edge of the canopy, and a second reefing line disposed a second distance away from the circumferential edge of the canopy that is greater than the first distance.

In addition to one or more of the features described above, or as an alternative to any of the foregoing embodiments, the at least one electrically controlled reefing line cutter includes a first reefing line cutter disposed adjacent to the first reefing line, and a second reefing line cutter disposed adjacent to the second reefing line.

According to yet another non-limiting embodiment, a method to electrically control release of a drogue parachute reefing line is provided. The method comprises determining at least one flight metric, detecting activation of a seat ejection sequence, determining a reefing cutting time duration based on the at least one flight metric, and deploying a drogue parachute having at least one reefing line existing in a first reefing state that restricts expansion of a canopy. The method further comprises determining expiration of the after deploying the drogue parachute, generating an electrical control signal in response to the expiration of the after deploying the drogue parachute, and initiating at least one reefing line cutter to place the at least one reefing line into a second reefing state based at least in part on the electrical control signal to expand the canopy.

In addition to one or more of the features described above, or as an alternative to any of the foregoing embodiments, initiating the at least one reefing line cutter includes delivering the electrical control signal from a controller to the at least one reefing line cutter, and in response to receiving the electrical control signal, initiating the at least one reefing line cutter to fire a knife blade and sever the at least one reefing line.

In addition to one or more of the features described above, or as an alternative to any of the foregoing embodiments, initiating the at least one reefing line cutter includes delivering the electrical control signal from a controller to an electrically controlled detonator of at least one explosive assembly line, in response to receiving the electrical control signal, generating an explosion force using the electrically controlled detonator, and delivering the explosion force from an energy output terminal of the at least one explosive assembly line to the at least one reefing line cutter. The at least one reefing line cutter fires a knife blade and severs the at least one reefing line in response to the explosion force.

In addition to one or more of the features described above, or as an alternative to any of the foregoing embodiments, initiating the at least one reefing line cutter includes initiating, at a first time period, a first reefing line cutter disposed a first distance away from a circumferential edge of the canopy, and initiating, at a second time period occurring later than the first time period, a second reefing line cutter disposed a second distance away from the circumferential edge of the canopy that is greater than the first distance.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
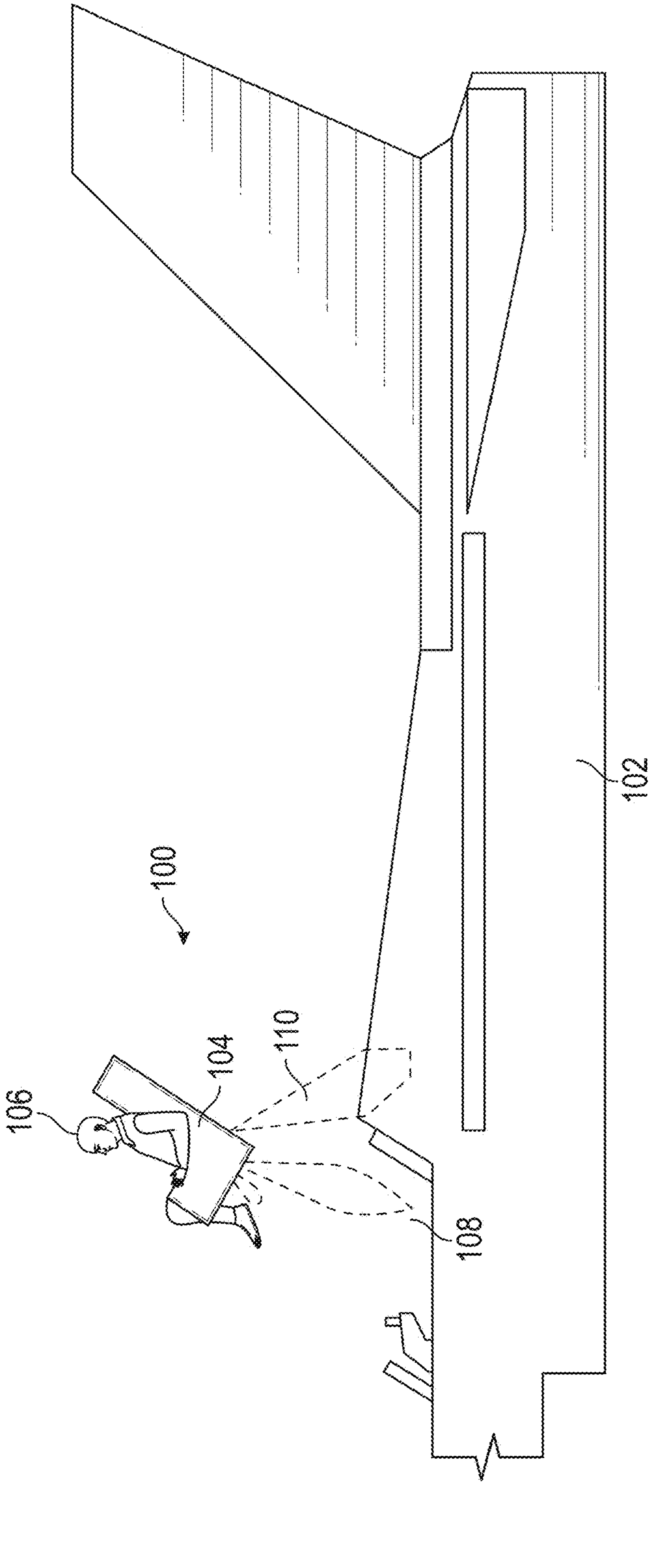
FIG. 1 illustrates an ejection seat being expelled (i.e., ejected) from an aircraft, in accordance with various embodiments.

Parachutes are used as safety devices for crew or other users (e.g., flight crew, pilots) to provide a mechanism to safely return a user to the Earth's surface (land or sea), such as from an ejection from an aircraft. During deployment of a parachute, the human body is subjected to various forces which are applied to the human body, through a harness or seat which are connected to a parachute. The harness or seat may include one or more attachment points for attaching to risers or a bridle that connect to suspension lines, which in turn connect to a parachute canopy.

The parachute canopy may be deployed, in part, by operation of a drogue parachute. The drogue parachute which may deploy rapidly in response to expulsion of an ejection seat from a cockpit of an aircraft. The drogue parachute may decelerate and stabilize the ejection seat to enable safe deployment of a main parachute. Drogue parachutes typically comprise a canopy, risers, and suspension lines. The canopy may increase drag, the suspension lines may connect the canopy to the risers/bridle, and the risers/bridle may attach the parachute to the person (e.g., harness) and/or object (e.g., ejection seat) being ejected. Drogue parachutes may be configured for staged deployment. For example, at a first deployment stage, the drogue parachute is reefed and the drogue canopy inflates to a first diameter, which may be relatively small to reduce opening loads. Subsequently, at a second deployment stage, the reefing line is cut and the drogue canopy inflates to a second, larger diameter. The rate of change in force during the inflation load spike can lead to injury and/or other damage to the users and/or components of the system. Current seats have no way to vary the duration of the reefing based on aircrew weight, speed, altitude, acceleration, etc. Furthermore, the reefing cutting time is achieved using a pyrotechnic fuse that has a fixed pyrotechnic timing duration. The pyrotechnic timing duration, however, has an accuracy of about plus or minus twenty-five percent (+/−25%). Optimizing the duration of the reefed period and reducing the timing tolerance would allow more precise control over the ejection and reduce the risk of injury.

Various non-limiting embodiments of the present disclosure provide an electronic drogue reefing release system that employs an electronically controlled cutter that is triggered by being hardwired to a controller, often referred to as a "sequencer controller" or a "seat sequencer". The seat sequencer actively determines the optimal time for the reefing lines to be released (e.g., cut or severed) based on flight metrics (such as weight, airspeed, acceleration, and altitude) rather than using a fixed pyrotechnic timing scheme (e.g., performed by a pyrotechnic fuse). Accordingly, the electronic drogue reefing release system allows for greater control over the reefing line cutting event, which improves reefing cutting time accuracy and mitigates the risk of injury during an ejection event.

Referring now to FIG. 1, an aircraft ejection system 100 is illustrated, in accordance with various embodiments. Aircraft ejection system 100 includes an aircraft 102 and an ejection seat 104. Ejection seat 104 may be installed in aircraft 102 and be configured to expel (i.e., eject) an occupant 106 (e.g., aircrew) from a cockpit 108. Ejection seat 104 may be propelled from aircraft 102, and more specifically, from cockpit 108 by a propellant 110. Propellant 110 may be configured to propel the combined mass of ejection seat 104 and occupant 106, and may consist of one or multiple cartridge and/or propellant actuated devices (e.g., mortars, catapults, rockets). Ejection seat 104 is configured to restrain and secure occupant 106 while in aircraft 102 and during the initial stages of an ejection event.

Figure 2A:
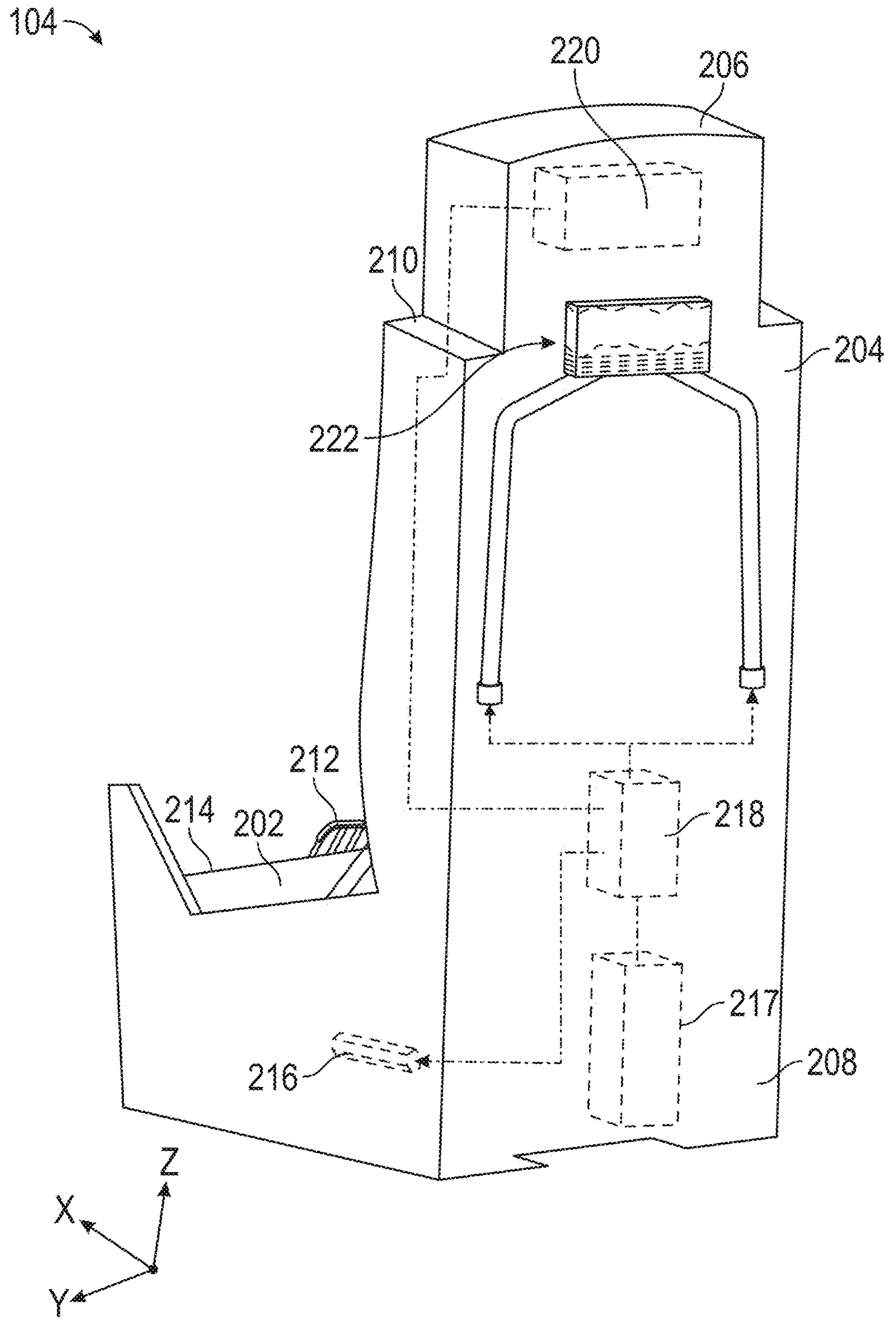
FIGS. 2A and 2B illustrate an ejection system, in accordance with various embodiments.

Referring now to FIG. 2A, components of ejection seat 104 are illustrated, in accordance with various embodiments. Ejection seat 104 includes a seat pan 202, a seatback 204, a headrest 206, an ejection initiation handle 212, a seat-aircrew separator (i.e., harness release) system 216, a catapult system 217, a controller 218, a main parachute 220, and, in various embodiments, a drogue parachute 222. Seat pan 202 may be located at a lower end 208 of seatback 204 and headrest 206 may be located at an upper end 210 of seatback 204.

Ejection seat 104 further includes an ejection handle 212 that, in various embodiments, may be located proximate a front side 214 of seat pan 202 (e.g., the positive x-direction). Front side 214 is opposite seatback 204. In various embodiments, ejection handle 212 may be located at a right side of seat pan 202 (e.g., the negative y-direction) and/or the left side of seat pan 202 (e.g., the positive y-direction). In various embodiments, ejection handle 212 may be centered between the right side and left side and configured to be between the legs of occupant 106. In various embodiments, ejection handle 212 may include more than one ejection handle. It should be understood that ejection handle 212 may be located in any position that is accessible to occupant 106 of ejection seat 104. Ejection handle 212 may be configured to initiate an ejection sequence upon actuation. For example, occupant 106 pulling/pushing ejection handle/lever/button 212 may cause ejection seat 104 to be expelled from aircraft 102.

Harness release system 216 secures ejection seat 104 to occupant 106. Harness release system 216 is connected to controller 218 and may receive signals from controller 218 controlling the activation of harness release system 216. Harness release system 216 disengages in one or multiple locations in response to signal(s) from controller 218, allowing ejection seat 104 to be separated from occupant 106 (i.e., seat-aircrew separation) after ejection from aircraft 102.

Catapult system 217 may secure ejection seat 104 to aircraft 102. Catapult system 217 may be connected to the power supply of controller 218 and may provide signals to power supply of controller 218 initiating activation of power supply of controller 218. Catapult system 217 is initiated by the aircraft 102 in response to a signal from ejection seat 104 in response to ejection handle 212 being actuated by occupant 106, allowing ejection seat 104 to be separated from aircraft 102. In various embodiments, catapult system 217 may further include propellent (e.g., propellant 110) for propelling ejection seat 104 away from aircraft 102. In various embodiments, catapult system 217 may further include separate propellant for propelling the ejection seat 104 up the rails of aircraft 102 and additional propellant (e.g., sustainer rocket propellant) for propelling the ejection seat 104 beyond aircraft 102 and away from structures and/or terrain.

Main parachute 220 (i.e., recovery parachute) may be located near upper end 210 of seatback 204. Main parachute 220 may be deployed after the ejection seat 104, including occupant 106, have cleared aircraft 102. The main parachute 220 is connected to controller 218 and may receive signals from controller 218 controlling the deployment of main parachute 220.

Drogue parachute 222 may be located near upper end 210 of seatback 204. In various embodiments, drogue parachute 222 may be located in other regions of seatback 204. Drogue parachute 222 may be deployed prior to deploying a delayed main parachute 220 in order to decelerate ejection seat 104 to a safe speed for deploying main parachute 220. Drogue parachute 222 is connected to controller 218 and may receive signals from controller 218 controlling the deployment and/or separation of drogue parachute 222.

Controller 218 controls the timing sequence of an ejection event in response to ejection handle 212 being actuated. The timing sequences that are managed by controller 218 may be different for each aircraft (e.g., aircraft 102). In various embodiments, the timing sequences are predetermined sequences for each aircraft. In various embodiments, controller 218 may receive input from one or more sensors that measure and output various real-time flight parameters in order to modify the timing sequences to the current conditions of ejection seat 104. The one or more sensors may include a temperature sensor, a pressure sensor, an air speed sensor, an altimeter, an accelerometer, and/or a gyroscope. Sensors may be capable of sensing in multiple axes and/or a discrete axis. Based on inputs from one or more of the sensors, controller 218 will control the deployment and/or release of harness release system 216, main parachute 220, and drogue parachute 222, in addition to other systems.

Figure 2B:
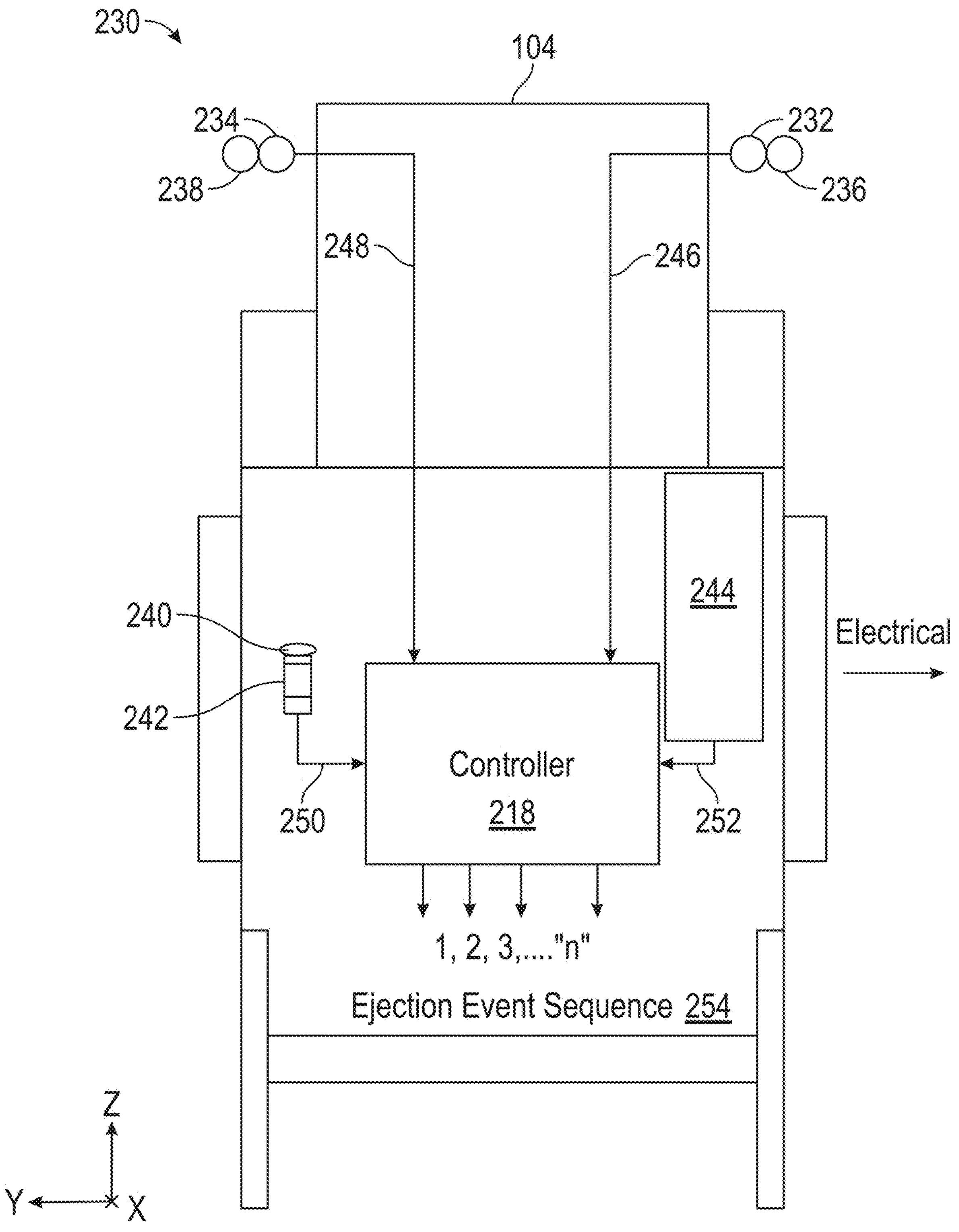

Referring now to FIG. 2B, a diagram 230 of ejection seat 104 is illustrated, in accordance with various embodiments. Diagram 230 includes controller 218 that may be connected to a first pressure sensor 232, a second pressure sensor 234, a first temperature sensor 236, a second temperature sensor 238, a third pressure sensor 240, a third temperature sensor 242, and accelerometer(s) 244. Controller 218 may be connected to first pressure sensor 232 and/or first temperature sensor 236 by a first connection 246 (e.g., wire, cable, tube, etc.). Controller 218 may be connected to second pressure sensor 234 and/or second temperature sensor 238 by a second connection 248. Controller 218 may be connected to third pressure sensor 240 and/or third temperature sensor 242 by a third connection 250. Controller 218 may be connected to accelerometer 244 by a fourth connection 252. In various embodiments, accelerometer 244 may include more than one accelerometer 244 each of which may be in different positions on ejection seat 104. In various embodiments, the sensors (e.g., accelerometer 244, first pressure sensor 232, first temperature sensor 236, etc.) may be integral to controller 218 (e.g.; via circuit board mount, manifold, etc.). It should be understood that the number, location, and signal output (e.g., electrical, pneumatic, etc.) of sensors illustrated and described with respect to FIG. 2B is for illustration and discussion purposes only. Accordingly, there may be more or fewer sensors and/or the sensors may be at different positions with respect to ejection seat 104 and controller 218.

Controller 218 receives inputs from one or more of the sensors and outputs an ejection sequence 254 that may be optimized for the current conditions of ejection seat 104. In various embodiments, controller 218 may be programmed with one or more predefined ejection sequences (e.g., ejection sequence 254), or a sequence of events that are preformed to complete ejection of the ejection seat 104. In various embodiments, controller 218 may calculate a modified ejection sequence based on the predefined ejection sequence and input from one or more of the sensors. The inputs from the one or more sensors may provide additional information with respect to the state of ejection seat 104 or the environment surrounding ejection seat 104. Controller 218 may use this additional information to improve the safety for each occupant 106 of ejection seat 104.

Controller 218 may receive input from one or more of accelerometers 244 during an ejection sequence (e.g., after ejection handle 212 is actuated). In various embodiments, accelerometer 244 may be calibrated before installation to ensure proper data (e.g., accuracy tolerances). Accelerometer 244 may provide acceleration data in three dimensions (e.g., along the x-axis, the y-axis, and the z-axis). In various embodiments, accelerometer may provide an acceleration and a direction to controller 218. In various embodiments, controller 218 may calculate an acceleration and a direction based on raw data received from accelerometer 244. In various embodiments, controller 218 may receive data from accelerometer 244 at regular time intervals. Each time interval may be about 0.5 milliseconds (ms) to about 20 ms, and more specifically, about 1 ms to about 4 ms. In various embodiments, controller 218 may receive data from accelerometer 244 after ejection handle 212 has been actuated.

Controller 218 uses data from accelerometer 244 to determine an approximate size of occupant 106 (e.g., weight, mass, height and/or the like) and adjusts ejection sequence 254 accordingly. For example, controller 218 may classify occupant 106 as small, medium, or large based on data from accelerometer 244 after ejection handle 212 is actuated. In various embodiments, controller 218 may classify occupant 106 as small or large. In various embodiments, controller 218 may have more than three classifications for the size of occupant 106 (e.g., very light, light, average, heavy, very heavy, and so on). In various embodiments, controller 218 may not assign classification to the size of occupant 106, but rather may indirectly calculate a change in velocity and assign a mass scalar which is useful for modification of the ejection sequence relative to the occupant size. Controller 218 determines a mass scalar based on the size of occupant 106 as inferred from various sensors and uses the determined mass scalar to modify ejection sequence 254. In various embodiments, the mass scalar may be about 0.5 to about 1.5, and more specifically, about 0.7 to about 1.3. In various embodiments, such as in the case of inertia dependent variable thrust profiles, a tighter mass scalar range of about 0.9 to about 1.1 may be used. The occupant size classifications are based on mass of the occupant along with any accompanying safety gear. In various embodiments, a small occupant may have a mass of less than about 150 lbs. (about 68 kilograms), a medium occupant may have a weight between about 150 lbs. (about 68 kilograms) and about 215 lbs. (about 97.5 kilograms), and a large occupant may have a weight of greater than about 215 lbs. (about 97.5 kilograms). In various embodiments, other ranges of mass may be used to identify the different size categories (e.g., small, medium, large). In various embodiments, ranges of change in velocity may be used to identify the different size categories (e.g., high, nominal, low) relative to a nominal, typical, or calibrated value.

Controller 218 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Controller 218 may further comprise memory to store data, executable instructions, system program instructions, and/or controller instructions to implement the control logic of controller 218.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 3:
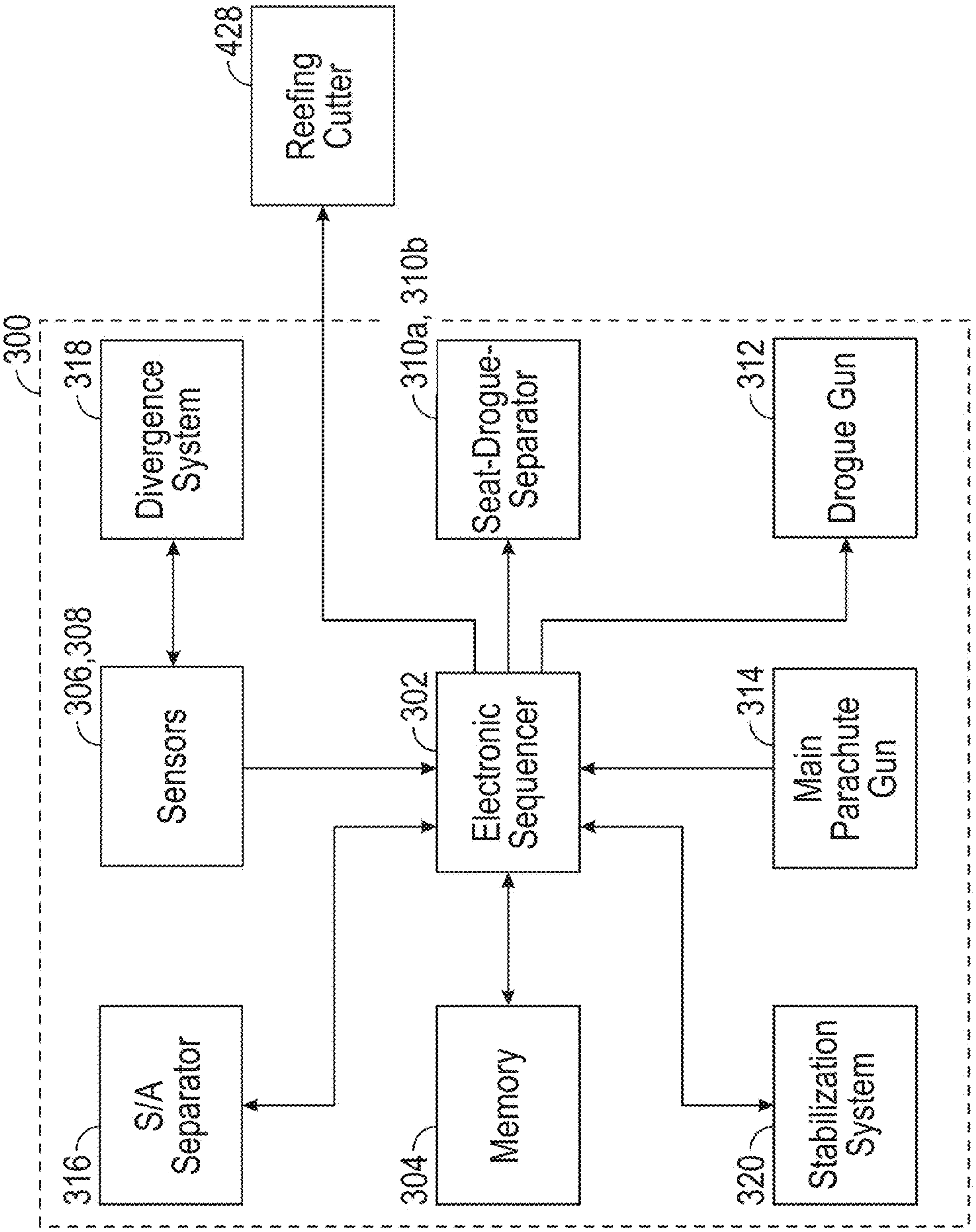
FIG. 3 illustrates a control system for ejection seat events, in accordance with various embodiments.

Turning to FIG. 3, a schematic block diagram of a control system 300 for the ejection system 100 of the aircraft 102 is illustrated, in accordance with various embodiments. Control system 300 includes an electronic sequencer controller 302, which may be implemented as controller 218 of FIG. 2B. The electronic sequencer controller 302 is in electronic communication with sensors 306, 308, which may include sensors such as one or more total (e.g., Pitot, Kiel, dynamic, etc.) pressure sensors and one or more static (e.g., base, wake, etc.) pressure sensors.

In various embodiments, the electronic sequencer controller 302 may be integrated into computer systems of ejection seat 104. In various embodiments, the electronic sequencer controller 302 may be configured as a central network element or hub to access various systems and components of control system 300. In various embodiments, the electronic sequencer controller 302 may be implemented in a single controller, while in other embodiments the electronic sequencer controller 302 may be implemented as and may include one or more controllers and/or one or more tangible, non-transitory memories (e.g., memory 304) and capable of implementing logic. The electronic sequencer controller 302 can include one or more processors, which can include, a digital signal processor (DSP), an application specific integrated circuit (ASIC), a field programmable gate array (FPGA) or other programmable logic device, discrete gate or transistor logic, discrete hardware components, or any combination thereof. The electronic sequencer controller 302 may comprise a processor configured to implement various logical operations in response to execution of instructions, for example, instructions stored on a non-transitory, tangible, computer-readable medium (e.g., memory 304) configured to communicate with electronic sequencer 302. System program instructions and/or controller instructions may be loaded onto a non-transitory, tangible computer-readable medium having instructions stored thereon that, in response to execution by a controller, cause the controller to perform various operations.

In various embodiments, the electronic sequencer controller 302 may be in electronic communication with the sensors 306, 308, which may be disposed on ejection seat 104. For example, sensor 306 may comprise a static pressure sensor (e.g., an altimeter, a barometer, or any other sensor configured for use in determining an altitude and/or a base pressure of an ejection system 100). In various embodiments, sensor 308 is configured to provide sensor data corresponding to a speed of ejection seat 104. For example, sensor 308 may comprise a total pressure sensor (e.g., to provide data to be used with static pressure data of sensor 306 for airspeed and/or dynamic pressure calculation of an ejection system 100), an optical sensor (e.g., a light detection and ranging (LiDAR) sensor, a photonic sensor or the like). Any sensor, or sensors configured for providing data to determine altitude and airspeed or equivalent parameters are within the scope of this disclosure. Based on the variable data measured from the sensors 306, 308 and receiving an ejection command, the sequence controller 302 may initiate a sequence of ejection events, implemented as ejection event sequence 254 of FIG. 2B, as described further herein.

In various embodiments, the control system 300 further comprises one or more seat-drogue separators 310*a*, 310*b* (e.g., severance system, shape charge, or the like), a drogue gun 312 (e.g., rocket, mortar, or the like), and a main parachute gun 314 (e.g. rocket, mortar, or the like), a seat-aircrew (S/A) separator 316 (e.g. latch, pin puller, or the like), a divergence system 318 (e.g. cartridge, rocket, or the like), and a stabilization system 320 (cartridge, rocket, or the like). In one or more embodiments, the seat-drogue separator can include a primary seat-drogue separator 310*a* and a secondary seat-drogue separator 310*b*.

The drogue gun 312 is configured to deploy the drogue parachute 222 from the ejection seat 104 of FIG. 2A from a stowed state to a deployed state. Similarly, the main parachute gun 314 is configured to deploy the main parachute 220 shown in FIG. 2A from a stowed state to a deployed state. The seat-drogue-separators 310*a*, 310*b* are configured to release (i.e., sever) the drogue parachute 222 from the ejection seat 104 during an ejection event. Similarly, the seat-aircrew-separator 316 is configured to release the occupant 106 from the ejection seat 104 during an ejection event; seat-aircrew-separator 316 may be implemented as harness release system 216 of FIG. 2A. Divergence system 318 and stabilization system 320 are configured propel ejection seat 104 and occupant 106 away from aircraft 102, other free bodies, and/or terrain on a predictable trajectory; Divergence system 318 and/or stabilization system 320 may be implemented as part of propulsion system 110 of FIG. 1. In various embodiments, the deployment, separation, divergence, and/or stabilization systems of control system 300 may comprise any fixed or articulating mechanism known in the art, such as a cartridge, rocket, mortar, slug, catapult, pilot chute, guillotine, release latch, pin puller, cable, linkage, piston, shape charge, gimbal, solenoid, or the like. The present disclosure is not limited in this regard.

The electronic sequencer controller 302 is configured to output a control signal which controls a reefing line cutter 428. Although a single reefing line cutter 428 is shown, it should be appreciated that additional reefing line cutters 428 can be employed to provide redundancy. According to an embodiment, the electronic sequencer controller 302 is connected to an electrically controlled reefing line cutter 428 via one or more small diameter signal cables. In this embodiment, the electronic sequencer controller 302 determines an optimal time to released (e.g., cut or sever) the reefing of the drogue parachute 222 based on various metrics including, but not limited to, occupant weight, airspeed, acceleration, and altitude. According to an embodiment, the sequencer controller 302 transmits redundant electrical firing pulses to the reefing line cutter 428 (e.g., via the power cables). In response to receiving the firing pulse, the reefing line cutter 428 fires its respective blade to sever the reefing line.

In another non-limiting embodiment, the electronic sequencer controller 302 is connected to the electrically controlled reefing line cutter 428 via one or more explosive assembly lines. An explosive assembly line can include, but is not limited to, Thin Layer Explosive (TLX) lines, Detonation Transfer Assembly (DTA) lines, and Explosive Transfer Assembly (ETA) lines. In this embodiment, the electronic sequencer controller 302 determines an optimal time to release (e.g., cut or server) the reefing of the drogue parachute 222 based on various flight metrics including, but not limited to, occupant weight, airspeed, acceleration, and altitude. According to an embodiment, the sequencer controller 302 transmits electrical detonation pulses to the explosive assembly explosive assembly lines. In response to receiving the detonating pulse, the explosive assembly lines detonate and fires the blade to sever the reefing line.

Figure 4A:
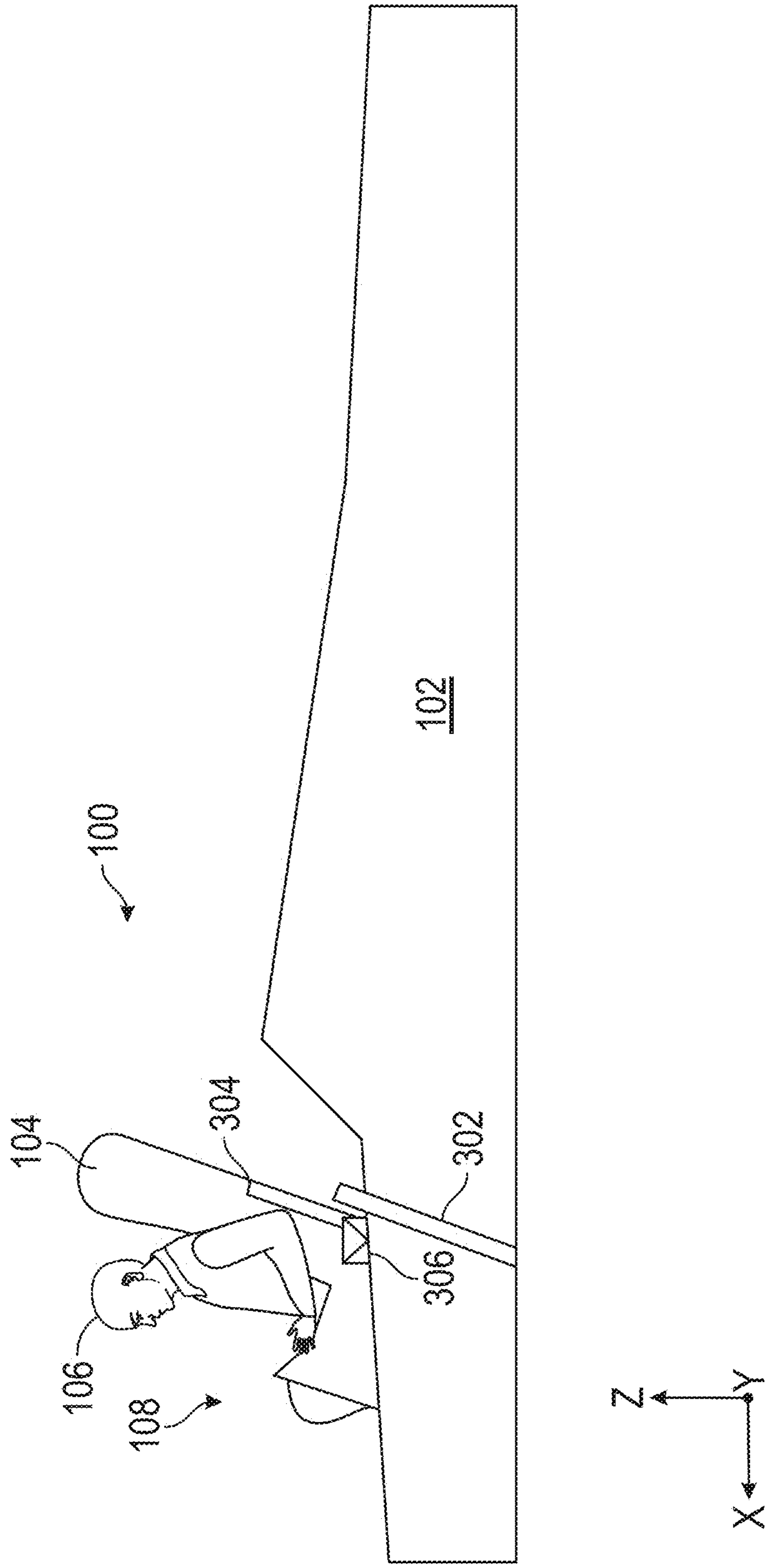
FIGS. 4A, 4B, 4C, and 4D illustrate various stages of an ejection system, in accordance with various embodiments.
Figure 4B:
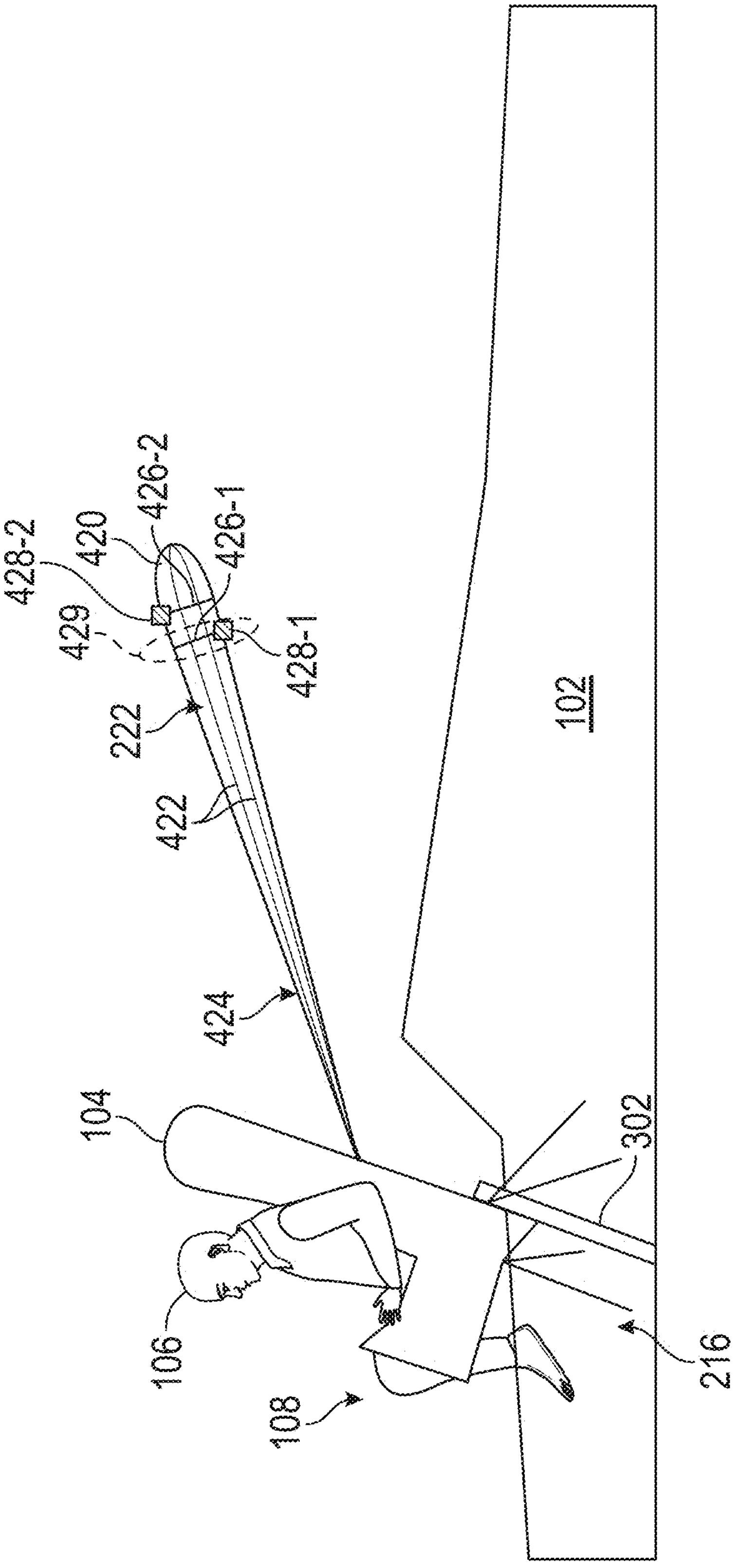

Referring now to FIGS. 4A-4D, stages of aircraft ejection system 100 are shown, in accordance with various embodiments. FIG. 4A illustrates a first stage of ejection system 100, including activation of a catapult propulsion system (e.g., catapult 217 of FIG. 2A) following an initial release of a canopy or other cockpit enclosure. FIG. 4B illustrates a second stage of ejection system 100, during or following the catapult phase, following start switch 306 activation, where drogue parachute 222 (e.g., drogue 222 of FIG. 2A) has been deployed.

Figure 4C:
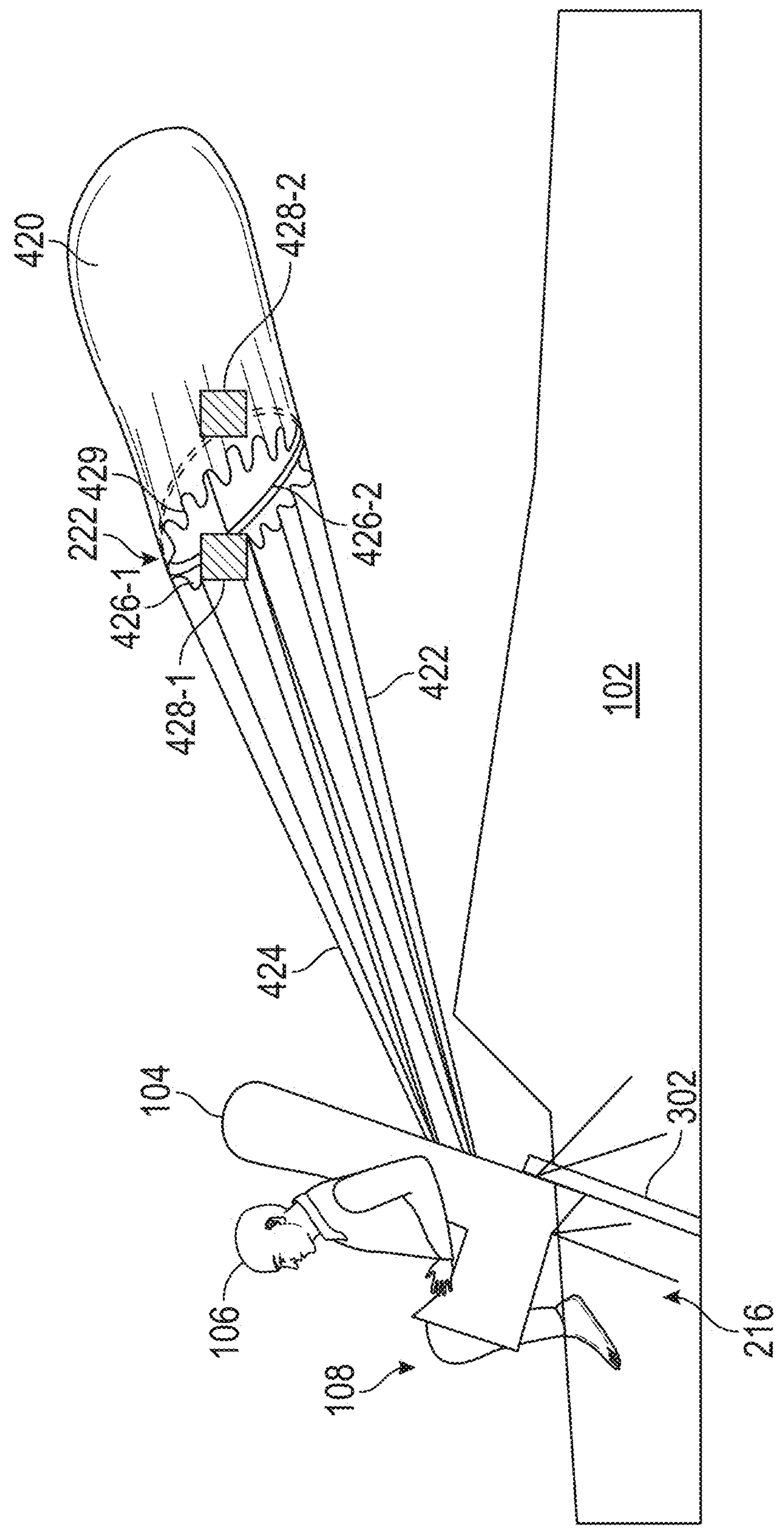
Figure 4D:
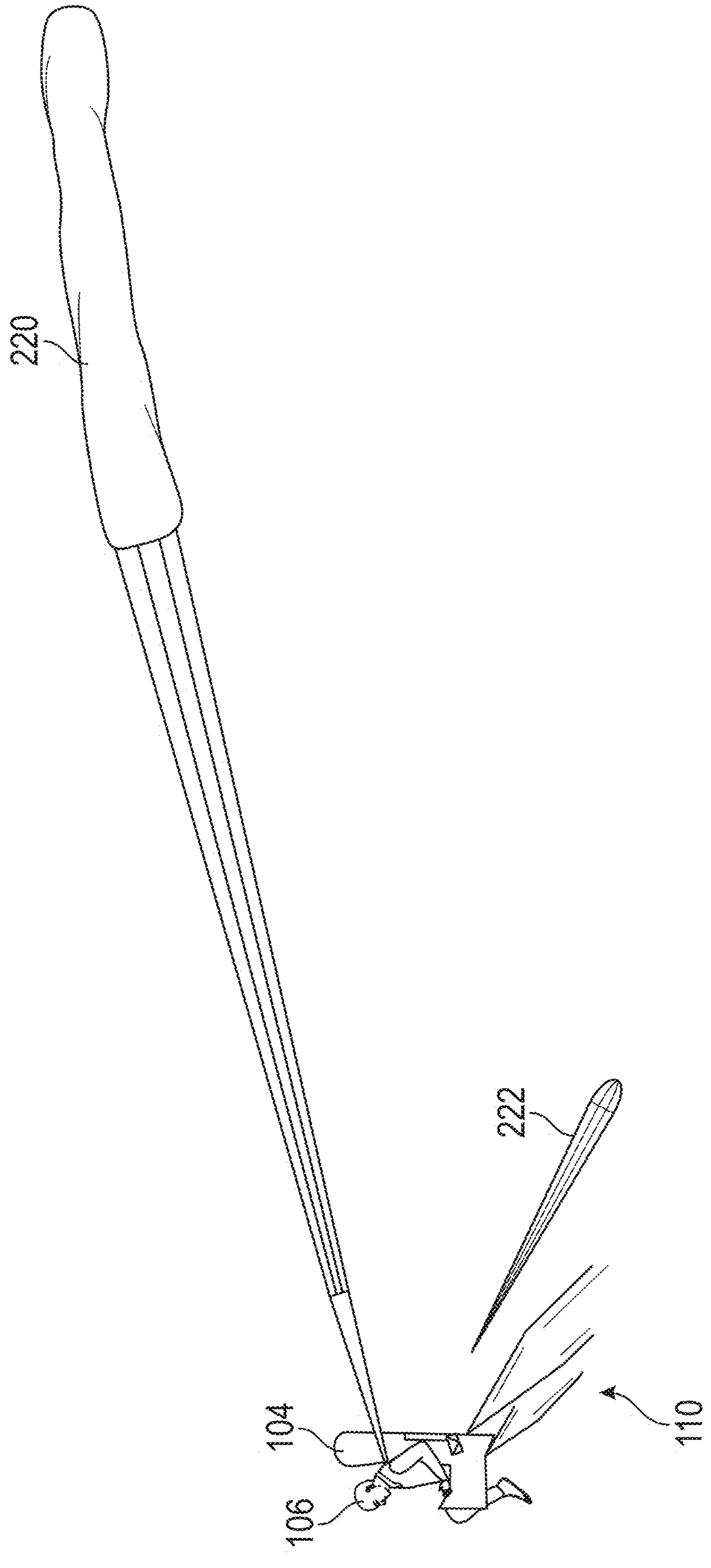

FIG. 4D illustrates a fourth stage of ejection system 100, including activation of a sustained propulsion system 110 (e.g., propulsion system 110 of FIG. 1, divergence system 318 and/or stabilization system 320 of FIG. 3, or combinations thereof).

During an ejection event, ejection seat 104 travels away from cockpit 108 (e.g., in the positive z-direction) along cockpit rails 302 and seat rollers/sliders 304 which direct ejection seat 104 safely out of cockpit 108 and away from aircraft 102. Drogue parachute 222 and/or main parachute 220 may be deployed prior to, after, or during ejection seat 104 exit from cockpit 108. Start switch 306 provides a signal indicating that ejection seat is leaving cockpit 108 and may be any detection mechanism known in the art to provide an electrical signal such as a position switch, a proximity sensor, or the like. It is understood that aircraft 102 may be in any orientation relative to earth during an ejection, that ejection seat 104 may travel at various vectors along rails 102 away from cockpit 108, and that factors such as the orientation of gravitational acceleration and/or aerodynamic loading relative to ejection system 100 must be accounted for in the calibration and/or optimization of the ejection system 100.

Referring first to FIG. 4A, the first stage of ejection sequence is illustrated. The first stage of ejection sequence begins when controller 218 powers on (e.g., time t1) and ends when start switch 306 is actuated (e.g., time t0). Controller 218 is connected to start switch 306 and receives a signal when actuated. In various embodiments, start switch 306 may include multiple switches for redundancy. Controller 218 begins recording acceleration data from accelerometer at regular time intervals beginning at time t1. In various embodiments, and for ease of discussion, the regular time interval may be about 1 ms to about 4 ms. As noted above, any time interval may be used and the time interval may vary for each aircraft (e.g., aircraft 102).

Referring to ejection seat 104 and occupant 106 being propelled away from cockpit 108, the change in velocity ($\Delta v$) correlates to propulsion system thrust T(t) (e.g., catapult propellant thrust), ejected mass m(t) (e.g., the combined mass of ejection seat 104 and occupant 106), acceleration a(t), and the elapsed time period ($\Delta t$). During the first stage of the ejection sequence, controller 218 may continuously calculate a change in velocity of ejection seat 104 and occupant 106 based on the received acceleration data. In various embodiments, the continuous calculation may be made over a predefined period of time. In various embodiments, the calculation time period is about 20 ms to about 100 ms, and more specifically about 40 ms to about 60 ms. In various embodiments, the calculation time period may be about 44 ms. For ease of discussion below, the time period of 44 ms will be used.

The change in velocity may be determined by integrating the acceleration data received from accelerometer 244 over the calculation time period. This calculation may be performed at each regular time interval (e.g., $\Delta t$=4 ms). In practice, controller 218 may perform a piecewise summation of the product of accelerometer readings and the reading frequency time interval (i.e., addition of discrete changes in velocity over an elapsed period) to determine an approximate total change in velocity. The equations used to determine the change in velocity in various embodiments are reproduced below:

$$\Delta v = \int_{t_1}^{t_0} \frac{|T(t)|}{m(t)} dt = \int_{t_1}^{t_0} a(t)dt = \lim_{\Delta t \to 0} \sum_{i=t_1}^{t_0} a(i)\Delta t$$

Controller 218 maintains a current calculated change in velocity. That is, controller 218 performs the computations described each time that controller 218 receives acceleration data. This allows controller 218 to use the calculated change in velocity over an elapsed time period as soon as start switch 306 is actuated. The first stage ends when start switch 306 is actuated (e.g., time $t_0$) at which time controller 218 has calculated the change in velocity from time $t_0$ backward to time $t_1$ over the calculation time period (e.g., 44 ms).

Referring next to FIG. 4B, the second stage of ejection sequence is illustrated. The second stage of ejection sequence begins when switch 306 is actuated (e.g., time $t_0$) and ends when controller 218 has determined an updated ejection sequence (e.g., ejection sequence 254) based on the change in velocity. Controller 218 retrieves the calculated change in velocity, determines an approximate size of occupant 106 (e.g., small, medium, or large) based on the change in velocity, and deploys a drogue parachute 122 to decelerate and stabilize the ejection seat 104 to enable safe deployment of a main parachute.

Controller 218 may then calculate a unitless mass scalar based on the change in velocity. In various embodiments, the mass scalar ($S_m$) is calculated as a sliding ratio of the calculated change in velocity ($\Delta v$) to a nominal, predefined change in velocity ($\Delta v_n$), as shown in the equation below:

$$S_m = \frac{\Delta v}{\Delta v_n}$$

The nominal change in velocity ($\Delta v_n$) may be based on calibration data for the given system (e.g., aircraft ejection system 100 including ejection seat 104, occupant 106, and aircraft 102) using an average, or mean, ejection mass (e.g., ejection seat 104, occupant 106, and any typical ejection or aircrew mounted equipment). In various embodiments, the nominal change in velocity ($\Delta v_n$) may be calibrated to account for other factors such as catapult tolerances, temperatures, aircraft speed range, ejection orientation range, rail angles, etc.

The mass scalar ($S_m$) may then be applied to proportionally scale ejection sequence timing throughout the ejection event. In various embodiments, failsafe thresholds, such as an upper threshold and a lower threshold, may be identified for safety of occupant 106. In various embodiments, the failsafe value may be $S_m$=1 in the event that $S_m$ is substantially greater than the upper threshold ($S_{max}$), substantially less than the lower threshold ($S_{min}$), or otherwise cannot be calculated and/or is determined to be invalid. In various embodiments, the upper threshold ($S_{max}$) may be about 1.1 to about 1.3 (e.g., for a light sized occupant 106 weighing less than the medium sized occupant 106). In various embodiments, the lower threshold ($S_{min}$) may be about 0.7 to about 0.9 (e.g., for a heavy sized occupant 106 weighing more than the medium sized occupant 106).

In a non-limiting embodiment, such as in the case of multiple redundant processors relaying and voting on values, additional scalar values can be determined such as, for example, scalar_local ($S_{LOCAL}$), scalar_left ($S_{LEFT}$), and scalar_right ($S_{RIGHT}$), where a local value is calculated on the local processor and left and right relay values are calculated on adjacent/redundant processors and thereafter relayed between processors. Accordingly, a scalar value median ($S_{MED}$) can be determined by taking the median of scalar_local ($S_{LOCAL}$), scalar_left ($S_{LEFT}$), and scalar_right ($S_{RIGHT}$), thereby ruling out extreme or erroneous values. The scalar value median can be defined as:

$$S_{MED} = \text{Median}\,[S_{LOCAL}, S_{LEFT}, S_{RIGHT}]$$

The drogue parachute 222 includes canopy 420, suspension lines 422, risers or bridles (risers/bridles) 424, one or more reefing lines 426-1, 426-2, and one or more reefing line cutters 428-1, 428-2. The canopy 420 may comprise any suitable type of canopy and any suitable type of material, such as, for example, canvas, silk, nylon, aramid fiber (e.g., KEVLAR®), polyethylene terephthalate, and/or the like. The suspension lines 422 may be coupled to canopy 420 using any suitable attachment technique, such as, for example, through stitching. The suspension lines 422 may be configured to at least partially stabilize deployed drogue parachute 222. The suspension lines 422 can be formed with a hollow body and can be weaved or otherwise bound to one another to form the risers/bridles 424. The risers/bridles 424 may be configured to attach to a harness, or other structure configured to secure the occupant 106 to the risers/bridles 424. The suspension lines 422 and the risers/bridles 424 may comprise any suitable material. For example, the suspension lines 422 may comprise a tubular braided material that constricts in diameter under tension, such as, for example, nylon, aramid fiber (e.g., KEVLAR®), and/or the like. The risers/bridles 424 may comprise a webbing formed from the weaved or otherwise bound together material of the suspension lines 422.

According to a non-limiting embodiment, the reefing lines include a first reefing line 426-1 and a second reefing line 426-2 that is separate from the first reefing line 426-1. The reefing lines 426-1 and 426-2 are configured to maintain the canopy in a first canopy position or a first canopy state (e.g., a fully closed, partially opened, etc.) while in a first reefing state (e.g., intact or not severed). The reefing lines 426-1, 426-2 can be coupled to the canopy 420 proximate a circumferential edge (e.g., skirt) 429 thereof. In various embodiments, the first reefing line 426-1 is adjacent to the circumferential edge 429 of the canopy 420 (e.g., a first distance from the circumferential edge 429) and the second reefing line 426-2 is adjacent to the first reefing line 426-1 and disposed further from the circumferential edge 429 of the canopy 420 than the first reefing line 426-1 (e.g., a second distance from the circumferential edge 429 that is greater than the first distance). In this manner, the reefing lines 426-1, 426-2 can restrict expansion of canopy 420 while intact (e.g., not severed or cut) such that canopy 420 sequentially opens in multiple stages.

The reefing line cutters 428-1 and 428-2 are configured to cut and sever the reefing lines 426-1 and 426-2, thereby placing the reefing lines 426-1 and 426-2 in a second reefing state. According to a non-limiting embodiment, a first reefing line cutter 428-1 is configured to cut the first reefing line 426-1 and a second reefing line cutter 428-2 is configured to cut the second reefing line 426-2. According to a non-limiting embodiment, the first reefing line cutter 428-1 can cut the first reefing line 426-1 at a first time period and the second reefing line cutter 428-2 can cut the second reefing line 426-2 at a second time period that occurs after the first time period. For example, the controller 302 can output a first electrical control signal at the first time period to initiate the first reefing line cutter 428-1 and can output a second electrical control signal at the second time period to initiate the second reefing line cutter 428-2. In this manner, the first and second reefing line cutters 428-1 and 428-2 can control opening of the canopy 420 at multiple stages.

Referring to FIG. 4C, the third stage of ejection sequence is illustrated. The third stage is initiated by the sequencer controller 302, which controls the first and second reefing line cutters 428-1, 428-2 to cut and sever the first and second reefing lines 426-1, 426-2, respectively. In a non-limiting embodiment, the sequencer controller 302 determines flight metrics (e.g., airspeed, acceleration, altitude, occupant weight, etc.) in real-time, and adjusts the reefing time at which to initiate the reefing line cutters and cut the reefing lines 426-1, 426-2 based on the determined flight metrics. In one or more non-limiting embodiment, reefing time includes a reefing cutting time duration that ranges from the time at which the drogue parachute 222 is deployed to a time at which to initiate the reefing line cutters and cut the reefing lines 426-1, 426-2. As described herein, the reefing cutting time duration can be actively calculated based on the determined flight metrics. Accordingly, the canopy 420 of the drogue parachute 222 is opened to decelerate and stabilize the ejection seat 104 to enable safe deployment of a main parachute.

In FIG. 4D, the fourth stage of ejection sequence is illustrated. The sequencer controller 302 invokes the fourth stage by controlling the seat-drogue-separators 310*a*, 310*b* and the main parachute gun 314. The seat-drogue-separators 310*a*, 310*b* are configured to release (i.e., sever) the drogue parachute 222 from the ejection seat 104, while the main parachute 220 is configured to deploy the main parachute 220. The sequence controller 302 can further output control signals to initiate propulsion system 110, the divergence system 318 and/or stabilization system 320.

Figure 5:
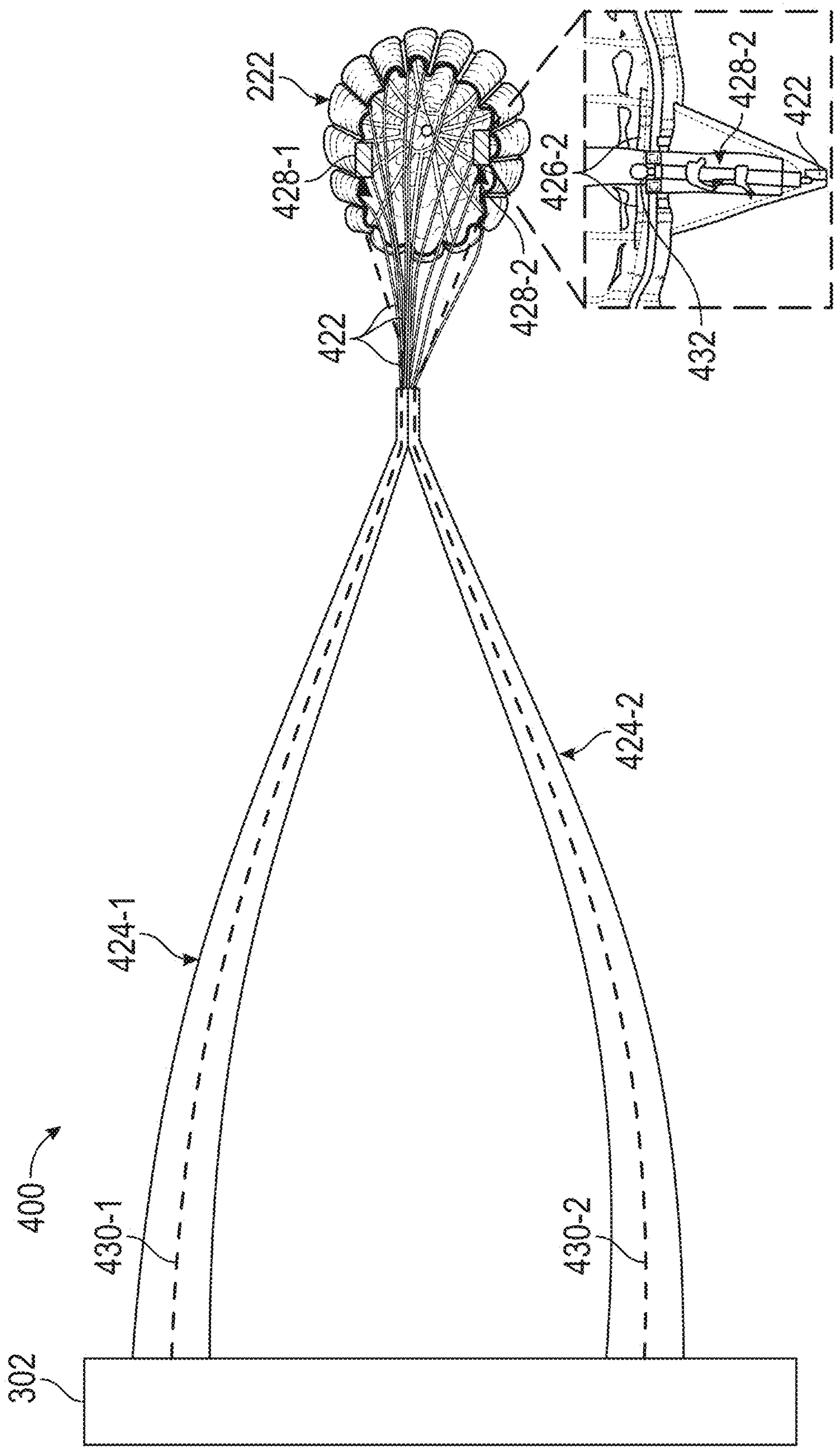
FIG. 5 depicts an electronic drogue reefing release system according to a non-limiting embodiment of the present disclosure.

Turning now to FIG. 5, an electronic drogue reefing release system 400 is illustrated according to a non-limiting embodiment of the present disclosure. The electronic drogue reefing release system 400 includes a sequencer controller 302 and a drogue parachute 222 that implements electrically controlled reefing line cutters 428-1 and 428-2. Various details of the drogue parachute 222 and the sequencer controller 302 will not be repeated for the sake of brevity.

First and second reefing line cutters 428-1 and 428-2 are electrically connected to the sequencer controller 302 via respective first and second signal lines 430-1 and 430-2. The first and second signal lines 430-1 and 430-2 can be fed from the sequencer controller 302, through the risers/bridles 424-1 and 424-2, and also through the hollow bodies of the suspension lines 422. The second end of the first and second signal lines 430-1 and 430-2 are connected to the electrically controlled reefing line cutters 428-1 and 428-2. Accordingly, the sequencer controller 302 can output electrical signal pulses, which activate the reefing line cutters 428-1 and 428-2 and cause them to transition from a first cutter state to a second cutter state. For example, in response to receiving the electrical control signal, the reefing line cutters 428-1 and 428-2 can fire their respective knife blade 432 forward to cut and sever the corresponding reefing lines 426-1 and 426-2.

Figure 6:
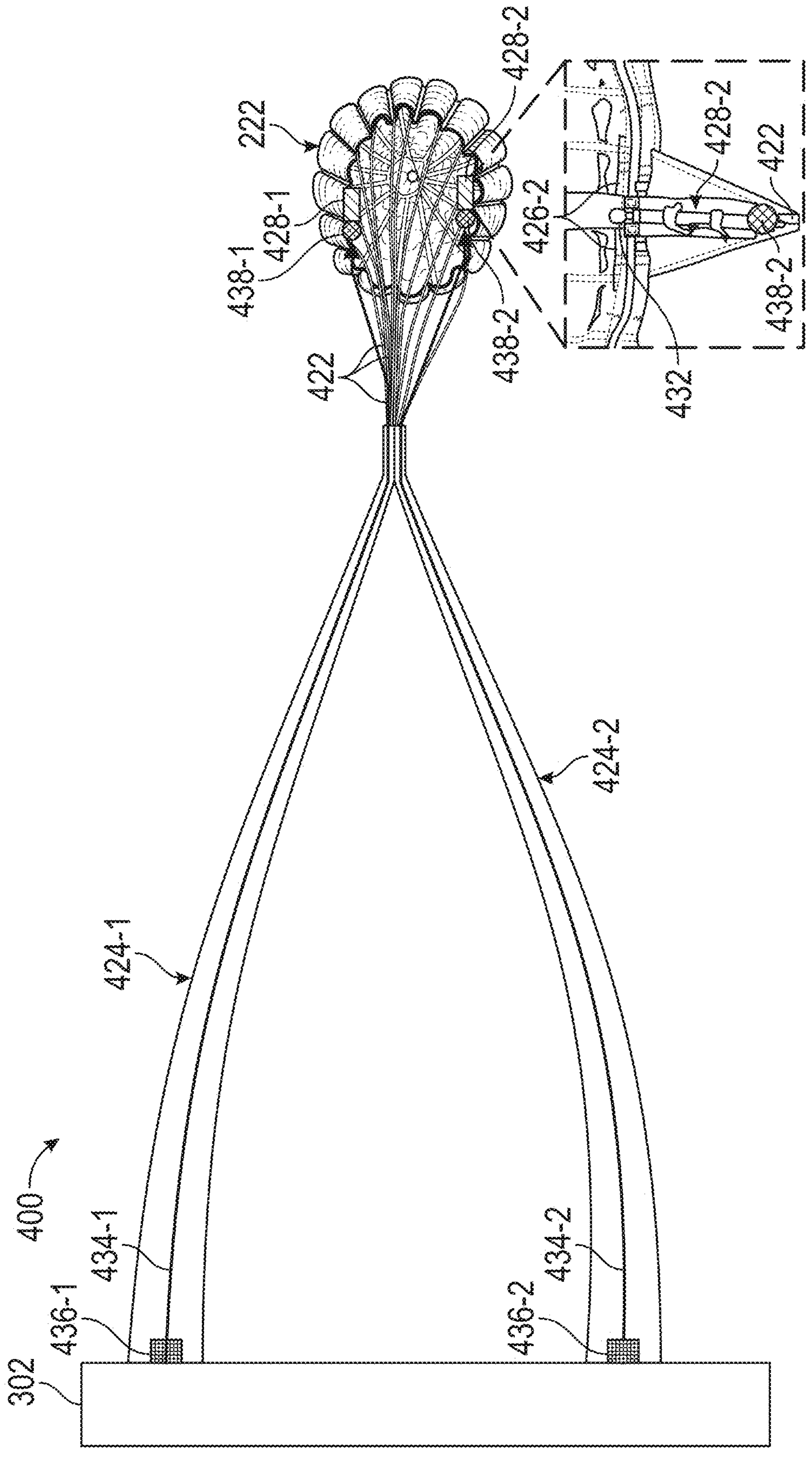
FIG. 6 depicts an explosive line drogue reefing release system according to another non-limiting embodiment of the present disclosure.

Referring to FIG. 6, an explosive line drogue reefing release system 400 is illustrated according to a non-limiting embodiment of the present disclosure. The electronic drogue reefing release system 400 includes a sequencer controller 302 and a drogue parachute 222 that implements pyrotechnically controlled reefing line cutters 428-1 and 428-2. Various details of the drogue parachute 222 and the sequencer controller 302 will not be repeated for the sake of brevity.

The pyrotechnically controlled first and second reefing line cutters 428-1 and 428-2 are connected to the sequencer controller 302 via respective first and second explosive assembly lines 434-1 and 434-2. The first and second explosive assembly lines 434-1 and 434-2 are fed through the risers/bridles 424-1 and 424-2 and also through the hollow bodies of the suspension lines 422. A first end of the explosive assembly lines 434-1 and 434-2 includes an electrically controlled detonator 436-1 and 436-2, which is electrically connected to the sequencer controller 302. An opposing second end of the explosive assembly lines 434-1 and 434-2 includes an energy output terminal 438-1 and 438-2, which is coupled to a respective reefing line cutter 428-1 and 428-2. The energy output terminal 438-1 and 438-2 includes, for example, an output gas terminal that expels concentrated gas (e.g., low-energy gas or high-energy gas), or a firing pin that fires a pin at a high velocity.

In response to receiving an electrical control signal (e.g., an electrical signal pulse) from the sequencer controller 302, the electrically controlled detonator 436-1 and 436-2 detonate an explosion event which generates a controlled explosion force that is travels through the explosive assembly lines 434-1 and 434-2. The explosion force causes the energy output terminal 438-1 and 438-2 to deliver an output (e.g., explosive force) that forces the reefing line cutter knife blade 432 forward, thereby cutting and severing the corresponding reefing lines 426-1 and 426-2.

Figure 7:
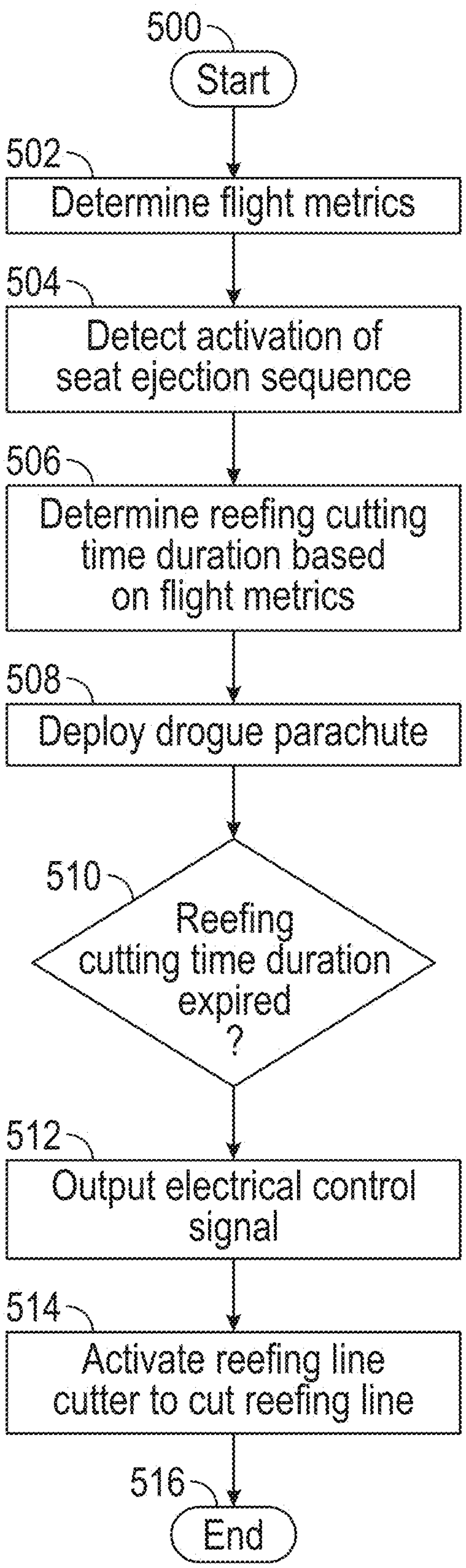
FIG. 7 is a flow diagram illustrating a method to electrically control release of a drogue parachute reefing line according to a non-limiting embodiment of the present disclosure.

Turning now to FIG. 7, a method to electrically control release of a drogue parachute reefing line is illustrated according to a non-limiting embodiment of the present disclosure. The method begins at operation 500, and at operation 502 flight metrics (e.g., occupant weight, airspeed, acceleration, and/or altitude) are determined in real time (e.g., by sequence controller 302). At operation 504, initiating of a seat ejection sequence is detected. At operation 506, a reefing cutting time duration is determined based on the determined flight metrics, and a drogue parachute is deployed at operation 508. At operation 510, a determination is made as to whether the reefing cutting time duration has expired. When the reefing cutting time has not expired, the method returns to operation 510 and continues monitoring the reefing cutting time duration. When, however, the reefing cutting time duration expires, the method proceeds to operation 512 and output an electrical control signal (e.g., from the sequence controller 302). At operation 514, the reefing line cutter is activated to cut the reefing line, and the method ends at operation 516.

Advantageously, in accordance with one or more non-limiting embodiments of the present disclosure, an electronic drogue reefing release system is provided that employs a reefing line cutter having a reefing cutting time that is controlled by a seat sequencer controller. The seat sequencer controller determines the optimal time for the reefing to be cut based on flight metrics (such as weight, airspeed, acceleration, and altitude), and initiates the reefing line cutting event. Accordingly, the electronic drogue reefing release system allows for greater control over the reefing cutting timing and reduces cutting time inaccuracies thereby mitigating the risk of injury during an ejection event.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An electronic drogue reefing release system comprising:

a drogue parachute including:

a canopy;

at least one reefing line coupled to the canopy, the at least one reefing line configured to restrict expansion of the canopy while in a first reefing state;

at least one electrically controlled reefing line cutter coupled to the canopy, the at least one electrically controlled reefing line cutter configured to place the at least one reefing line into a second reefing state in response to receiving an electrical signal so as to expand the canopy; and at least one signal line in signal communication with the at least one electrically controlled reefing line cutter to deliver the electrical control signal, wherein the at least one electrically controlled reefing line cutter cuts the at least one reefing line to open the canopy in the second reefing state while the drogue parachute remains coupled to an ejection seat.

2. The electronic drogue reefing release system of claim 1, further comprising a controller in signal communication with the at least one signal line, the controller configured to determine at least one reefing cutting time duration, and to output the electrical control signal in response to an expiration of the at least one reefing cutting time duration.

3. The electronic drogue reefing release system of claim 2, wherein the at least one reefing cutting time duration is based on at least one flight metric.

4. The electronic drogue reefing release system of claim 3, wherein the at least one flight metric includes one or a combination of occupant weight, airspeed, acceleration, and altitude.

5. The electronic drogue reefing release system of claim 4, further comprising:

a plurality of suspension lines coupled to the canopy; and at least one bridle including a first end coupled to the suspension lines and an opposing second end coupled to the ejection seat, wherein the at least one signal line is coupled to the bridle and at least one of the suspension lines.

6. The electronic drogue reefing release system of claim 4, wherein the at least one electrically controlled reefing line cutter includes a knife blade configured to sever the at least one reefing line in response to receiving the electrical signal to place the at least one reefing line into the second reefing state.

7. The electronic drogue reefing release system of claim 4, wherein the at least one reefing line includes:

a first reefing line disposed a first distance away from a circumferential edge of the canopy; and a second reefing line disposed a second distance away from the circumferential edge of the canopy that is greater than the first distance.

8. The electronic drogue reefing release system of claim 7, wherein the at least one electrically controlled reefing line cutter includes:

a first electrically controlled reefing line cutter disposed adjacent to the first reefing line; and a second electrically controlled reefing line cutter disposed adjacent to the second reefing line.

9. An electronic drogue reefing release system comprising:

a drogue parachute including:

a canopy;

at least one reefing line coupled to the canopy, the at least one reefing line configured to restrict expansion of the canopy while in a first reefing state;

at least one reefing line cutter coupled to the canopy, the at least one reefing line cutter configured to place the at least one reefing line into a second reefing state in response to receiving an electrical signal so as to expand the canopy; and at least one explosive assembly line having a first end coupled to an electrically controlled detonator and an opposing second end coupled to an energy output terminal, wherein the electrically controlled detonator is configured to receive an electrical control signal and to generate an explosion force in response to the electrical control signal, and wherein the energy output terminal is configured to deliver the explosion force to the at least one reefing line cutter, and wherein the at least one reefing line cutter cuts the at least one reefing line to expand the canopy according to the second reefing state while the drogue parachute remains coupled to an ejection seat.

10. The electronic drogue reefing release system of claim 9, further comprising a controller in signal communication with the electrically controlled detonator, the controller configured to determine at least one reefing cutting time duration, and to output the electrical control signal in response to an expiration of the at least one reefing cutting time duration.

11. The electronic drogue reefing release system of claim 10, wherein the reefing cutting time duration is based on at least one flight metric.

12. The electronic drogue reefing release system of claim 11, wherein the at least one flight metric includes one or a combination of occupant weight, airspeed, acceleration, and altitude.

13. The electronic drogue reefing release system of claim 12, further comprising:

a plurality of suspension lines coupled to the canopy; and at least one bridle including a first end coupled to the suspension lines and an opposing second end coupled to the ejection seat, wherein the at least explosive assembly line is coupled to the bridle and at least one of the suspension lines.

14. The electronic drogue reefing release system of claim 12, wherein the at least one reefing line cutter includes a knife blade configured to sever the at least one reefing line in response to receiving the explosion force to place the at least one reefing line into the second reefing state.

15. The electronic drogue reefing release system of claim 12, wherein the at least one reefing line includes:

a first reefing line disposed a first distance away from a circumferential edge of the canopy; and a second reefing line disposed a second distance away from the circumferential edge of the canopy that is greater than the first distance.

16. The electronic drogue reefing release system of claim 15, wherein the at least one electrically controlled reefing line cutter includes:

a first reefing line cutter disposed adjacent to the first reefing line; and a second reefing line cutter disposed adjacent to the second reefing line.

* * * * *